US008339009B2

(12) United States Patent
Mueller et al.

(10) Patent No.: US 8,339,009 B2
(45) Date of Patent: Dec. 25, 2012

(54) MAGNETIC FLUX CONDUCTING UNIT

(75) Inventors: Markus Mueller, Edinburgh (GB); Alasdair Stewart McDonald, Edinburgh (GB)

(73) Assignee: NGenTec Ltd., Edinburgh (GB)

( * ) Notice: Subject to any disclaimer, the term of this patent is extended or adjusted under 35 U.S.C. 154(b) by 207 days.

(21) Appl. No.: 12/677,204

(22) PCT Filed: Sep. 8, 2008

(86) PCT No.: PCT/GB2008/003028
§ 371 (c)(1),
(2), (4) Date: Apr. 15, 2010

(87) PCT Pub. No.: WO2009/034302
PCT Pub. Date: Mar. 19, 2009

(65) Prior Publication Data
US 2010/0213787 A1   Aug. 26, 2010

(30) Foreign Application Priority Data

Sep. 12, 2007   (GB) .................................. 0717746.2

(51) Int. Cl.
H02K 1/22       (2006.01)
H02K 21/26      (2006.01)
H02K 21/38      (2006.01)
H02K 23/04      (2006.01)
(52) U.S. Cl. .......... 310/216.023; 310/266; 310/216.107; 310/216.024; 310/216.025
(58) Field of Classification Search ........... 310/216.107, 310/266, 268, 154.01, 154.03, 154.32, 154.42, 310/216.023, 216.024, 216.025; H02K 1/22, H02K 21/26, 21/38, 23/04
See application file for complete search history.

(56) References Cited

U.S. PATENT DOCUMENTS

| | | | | | |
|---|---|---|---|---|---|
| 4,209,724 | A | * | 6/1980 | Periou | 310/154.03 |
| 6,762,525 | B1 | * | 7/2004 | Maslov et al. | 310/112 |
| 2002/0153792 | A1 | * | 10/2002 | Isozaki et al. | 310/112 |
| 2002/0195580 | A1 | * | 12/2002 | Chang | 251/65 |
| 2003/0155818 | A1 | * | 8/2003 | Koyanagawa et al. | 310/12 |
| 2004/0007936 | A1 | * | 1/2004 | Cros et al. | 310/257 |
| 2004/0012294 | A1 | * | 1/2004 | Rippel et al. | 310/217 |
| 2004/0207281 | A1 | * | 10/2004 | Detela | 310/162 |
| 2005/0077800 | A1 | * | 4/2005 | Hoeijmakers | 310/266 |
| 2005/0212377 | A1 | * | 9/2005 | Wang et al. | 310/259 |
| 2006/0038461 | A1 | * | 2/2006 | Gabrys | 310/266 |

FOREIGN PATENT DOCUMENTS

| | | |
|---|---|---|
| JP | 60223466 A | 11/1985 |
| JP | 2001258221 A | 9/2001 |
| WO | WO-2007104976 A1 | 9/2007 |

OTHER PUBLICATIONS

Sedlmeyer, Rafael, "International Search Report", for PCT/GB2008/003028 as mailed Jan. 14, 2009, 2 pages.

* cited by examiner

*Primary Examiner* — Quyen Leung
*Assistant Examiner* — Terrance Kenerly
(74) *Attorney, Agent, or Firm* — Winstead PC

(57) ABSTRACT

The present invention relates to a magnetic flux conducting unit (10) for electromagnetic apparatus, the electromagnetic apparatus being operative to convert one of mechanical energy and electrical energy into the other of mechanical energy and electrical energy. The magnetic flux conducting unit comprises at least one magnetic flux conducting element (12a, 12b) formed of a magnetically permeable material. Also, the at least one magnetic flux conducting element defines: a coil receiving space (18) for receiving a coil assembly (32) of the electromagnetic apparatus; and at least one material receiving space (16, 30a, 30b), which accommodates a substantially magnetically impermeable material.

18 Claims, 8 Drawing Sheets

MAGNETIC FLUX CONDUCTING UNIT

FIELD OF THE INVENTION

The present invention relates to a magnetic flux conducting unit for electromagnetic apparatus, such as a generator. In particular, but not exclusively, the present invention relates to a magnetic flux conducting unit for electromagnetic apparatus, such as a generator, the unit comprising at least one magnetic flux conducting element.

BACKGROUND TO THE INVENTION

In the field of electricity generation, it is well known to provide a generator coupled to a fluid driven turbine such as those found in oil, gas, coal and nuclear power stations. Conventional generators comprise a rotor having an iron core with a number of current-carrying coils wound on the core, and an iron-cored stator carrying a winding. A magnetic field is generated by passing a current along the rotor coils such that, on rotation of the rotor, a current is induced in the coils of the stator winding.

In recent years, significant research has been conducted Worldwide into sustainable electricity generation methods, including wind, wave and tidal power generation. Through this research, wind machines have been developed which comprise a prime mover in the form of a large diameter rotor having a number of rotor blades, mounted on a rotor shaft, which is in turn coupled to a power generator. The wind machines include rotary generators which operate in a similar fashion to the large-scale generators found in power stations and described above, save that a gear mechanism is required to enable the generator to operate at the relatively low velocity and high output torque of the rotor.

Use of such gear mechanisms is generally undesired as there are a number of significant disadvantages. In particular, the gear mechanisms are relatively large and heavy, greatly increasing the weight of the unit provided in the nacelle at the top of the wind turbine tower. Additionally, provision of a gear mechanism between the output shaft of the turbine rotor and the input shaft of the generator reduces the efficiency of the machine. Furthermore, these gear mechanisms have been found to be surprisingly unreliable under typical wind turbine operating conditions. The main cause for this is the constant variation in the operating speed and torque transmitted through the gear mechanisms, which is due to fluctuations in wind velocity.

Similar problems have been experienced in power generation systems using wave and tidal forces, where the prime movers of the systems operate at even lower rotational or cycling velocities, and hence at still higher torques or thrust forces.

To address these problems, different types of power generators have been developed which are designed for low speed, high torque operation, for direct connection to, for example, the rotor of a wind machine. These generators are significantly larger than prior generators connected through a gearbox.

A significant disadvantage to such directly coupled generators is that the iron core of the generator (which provides an active magnetic function) and structural support for the iron core (which provides a purely mechanical function of maintaining a physical air gap between stationary and rotating/reciprocating components) is very large, and thus the overall mass is high. Where the generator is provided in a wind machine, mounted in a nacelle at a top of a tower of the machine, significant problems are encountered in the requirement to strengthen the tower to support the additional weight of the generator; in raising and locating the nacelle on the tower; and in removing the generator/nacelle for maintenance.

Similar problems are encountered in other types of sustainable electricity generation, which may utilise a direct drive of the type described above (such as in wave machines and tidal current machines), and which may utilise a rotary or linear type generator.

Furthermore, whilst the mass of such direct drive generators has been found to be a particular problem in low speed/high torque output sustainable electricity generation machines, it will be appreciated that prior generators such as those used in conventional power stations are also of a significant mass, due in the main to the mass of the iron cores used. In the case of such conventional generators, however, the iron core provides both a structural function as well as a magnetic flow path, which is in contrast to known direct drive generators in which two separate components provide magnetic and structural functions.

It is therefore amongst the objects of embodiments of the present invention to obviate or mitigate at least one of the foregoing disadvantages.

STATEMENT OF INVENTION

According to a first aspect of the present invention, there is provided a magnetic flux conducting unit for electromagnetic apparatus, the electromagnetic apparatus being operative to convert one of mechanical energy and electrical energy into the other of mechanical energy and electrical energy, the magnetic flux conducting unit comprising at least one magnetic flux conducting element formed of a magnetically permeable material, the at least one magnetic flux conducting element defining:
 a coil receiving space for receiving a coil assembly of the electromagnetic apparatus; and
 at least one material receiving space, which accommodates a substantially magnetically impermeable material.

Providing such a magnetic flux conducting unit permits savings in mass when compared to conventional flux conducting units, by appropriate selection of magnetically impermeable materials for the at least one material receiving space defined by the magnetic flux conducting unit. In particular, when compared to flux conducting units of conventional generators of the type currently found in wind machines, the magnetic flux conducting unit of the present invention offers the possibility to significantly reduce the mass of a generator incorporating the unit, without a significant loss in magnetic flux carrying capacity and without significant loss in mechanical strength.

Alternatively or in addition, the coil receiving space and the at least one material receiving space may be spaced apart from each other by a part, such as a wall, of the magnetic flux conducting element.

Alternatively or in addition, the material receiving space may be defined by at least two walls of the magnetic flux conducting element, the at least two walls being disposed on a same side of the coil receiving space.

Alternatively or in addition, the at least one material receiving space may be formed as an open channel, an opening of the channel being one of:
facing towards the coil receiving space; and facing away from the coil receiving space.

More specifically, the opening of the channel may face in a substantially opposite direction to the coil receiving space.

Alternatively or in addition, the at least one material receiving space may be formed as a bore extending along at least a part of the magnetic flux conducting element.

More specifically, the bore may be open at least one of two opposing ends of the bore.

Alternatively or in addition, the material receiving space may be of substantially rectangular form along a direction substantially perpendicular to a direction of flow of flux through the magnetic flux conducting element.

Alternatively or in addition, the at least one magnetic flux conducting element may be formed of a material having a relatively high magnetic flux carrying capacity, in particular iron or steel. Also, the at least one magnetic flux conducting element may be configured to bear at least a majority of loads imparted on the magnetic flux conducting element during use of the electromagnetic apparatus.

Alternatively or in addition, the at least one material receiving space may extend along a length of the magnetic flux conducting element.

Alternatively or in addition, the at least one material receiving space may extend along a direction of flow of magnetic flux in the at least one magnetic flux conducting element during use of the magnetic flux conducting unit.

Alternatively or in addition, the magnetic flux conducting element may comprise a main body and at least one elongate member extending from and along the main body, the at least one material receiving space being defined by the at least one elongate member and the main body. For example, a plurality of elongate members may extend from the main body so as to form a comb like structure.

Alternatively or in addition, the magnetic flux conducting element may be one of generally I-shaped or generally c-shaped in cross-section. A direction of the cross-section may be orthogonal to a direction of flow of magnetic flux in the magnetic flux conducting element, during use of the magnetic flux conducting unit.

The substantially magnetically impermeable material may comprise at least one of a fluid, a gel and a solid. The gel may contain solids particles suspended therein.

Alternatively or in addition, the substantially magnetically impermeable material may be of a lower density than the magnetic flux conducting element. For example, the substantially magnetically impermeable material may be a time-setting and/or molten material received in the material receiving space. In still further alternative embodiments, the magnetic flux conducting element may comprise a core of a solids material with a shell or frame around the core, with the core being of a lower density than the shell.

Alternatively or in addition, the magnetically impermeable material may comprise a gas, such as air.

Alternatively or in addition, the material receiving space may be substantially completely filled with the magnetically impermeable material.

In an application in which the magnetic flux conducting unit is stationary, when in use of the electromagnetic apparatus, the at least one magnetic flux conducting element may be configured such that a substantially magnetically impermeable fluid flows through the at least one material receiving space. Thus, the flowing fluid may provide for cooling of the magnetic flux generating element. More specifically, the magnetic flux conducting unit may comprise a pump or the like to effect a flow of the fluid in the material receiving space.

Alternatively or in addition, the magnetic flux conducting unit may comprise first and second magnetic flux conducting elements spaced apart from each other with the coil receiving space being defined therebetween. At least one material receiving space may be defined by at least one of the first and second magnetic flux conducting elements.

More specifically, the magnetic flux conducting unit may comprise at least one connecting portion connecting opposing faces of the first and second magnetic flux conducting elements. Thus, in use of the electromagnetic apparatus the at least one connecting portion may conduct flux between the electromagnetic flux conducting portions. Hence, a connecting portion constitutes a magnetic flux conducting element, which may define at least one material receiving space. Where the electromagnetic apparatus comprises first and second connecting elements, the first and second connecting portions may disposed towards opposing ends of the first and second magnetic flux conducting elements.

Alternatively or in addition, a flux conducting element may define a footprint, the coil receiving space being outside the footprint and the at least one material receiving space being inside the footprint.

In accordance with the teachings of the applicant's International Patent Application no. PCT/GB2007/000883, the magnetic flux conducting unit may further comprise: at least one magnet; a pair of opposed magnetic flux conducting elements defining a coil receiving space therebetween for receiving a coil assembly of a generator or motor, each magnetic flux conducting element defining at least one material receiving space; and at least one connecting portion extending between the opposed magnetic flux conducting elements; wherein the at least one magnet is arranged relative to the opposed magnetic flux conducting elements such that magnetic attraction forces between the elements are reacted through and balanced within the connecting portion.

The at least one connecting portion may define at least one material receiving space, in a similar fashion to the magnetic flux conducting elements defined above. Accordingly, the at least one connecting portion may comprise one or more void or chamber, or one or more recess, channel or groove. One of the coil assembly and the magnetic flux conducting element may move and the other of the coil assembly and the magnetic flux conducting element may be stationary; such alternative configurations of motor or generator are well known.

According to a second aspect of the present invention, there is provided electromagnetic apparatus comprising a flux conducting unit according to the first aspect of the present invention.

More specifically, the electromagnetic apparatus may be one of a generator and a motor.

Alternatively or in addition, the electromagnetic apparatus may comprise at least one coil assembly received in a respective at least one coil receiving space defined by the at least one magnetic flux conducting element.

More specifically, each coil assembly may be one of an air-cored coil assembly and an iron-cored coil assembly.

Further features of the second aspect of the present invention may comprise one or more features of the first aspect of the present invention.

According to a third aspect of the present invention, there is provided a power generation machine comprising an electromagnetic apparatus configured to operate as generator, the electromagnetic apparatus comprising a magnetic flux conducting unit according to the first aspect of the present invention.

Features of the third aspect of the present invention may comprise one or more features of the first or second aspect of the present invention.

According to a further aspect of the present invention, there is provided a magnetic flux conducting unit for electromagnetic apparatus, the unit comprising at least one magnetic flux conducting element having at least two regions of different magnetic flux carrying capacities.

More specifically, the at least one magnetic flux conducting element may be configured such that a variation in flux carrying capacity provided by the at least two regions is in a direction orthogonal to a direction of magnetic flux flowing in the at least one magnetic flux conducting element during use of the magnetic flux conducting unit.

In preferred embodiments, the at least one magnetic flux conducting element comprises a main region and at least one further region, a flux carrying capacity of the main region being greater than a flux carrying capacity of the at least one further region. Where the element comprises a plurality of further regions, the flux carrying capacity of the main region may be higher than flux carrying capacities of each of the further regions. The main region may be of a material having a relatively high magnetic flux carrying capacity, in particular iron or steel, and may be adapted to bear a majority/all mechanical loads imparted on the element, in use of the unit.

Further features of the further aspect of the present invention may comprise one or more features of any previous aspect of the present invention.

BRIEF DESCRIPTION OF THE DRAWINGS

Embodiments of the present invention will now be described, by way of example only, with reference to the accompanying drawings, in which.

SPECIFIC DESCRIPTION

Figure 1:
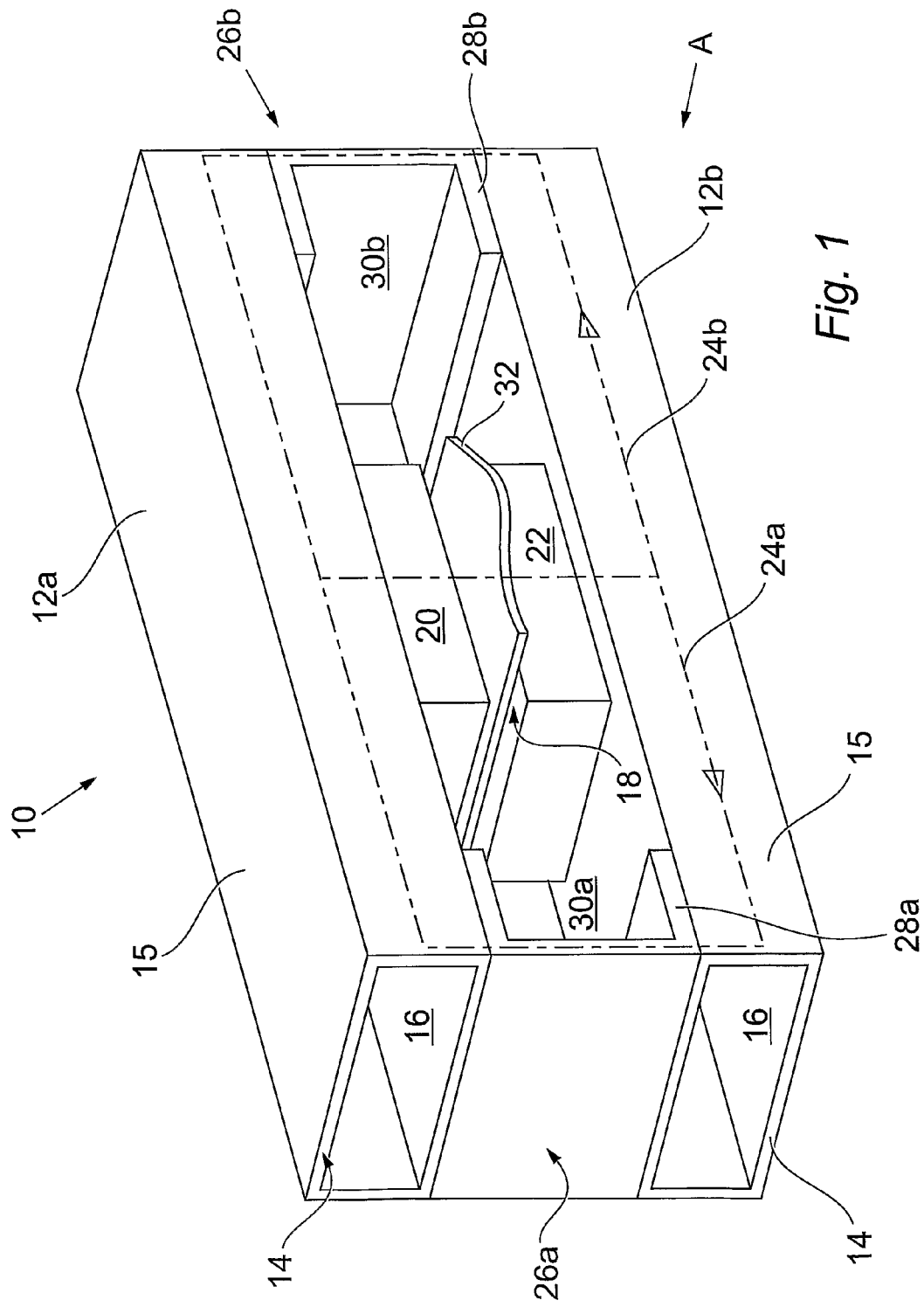
FIG. 1 is a perspective view of a magnetic flux conducting unit in accordance with an embodiment of the present invention.
Figure 2:
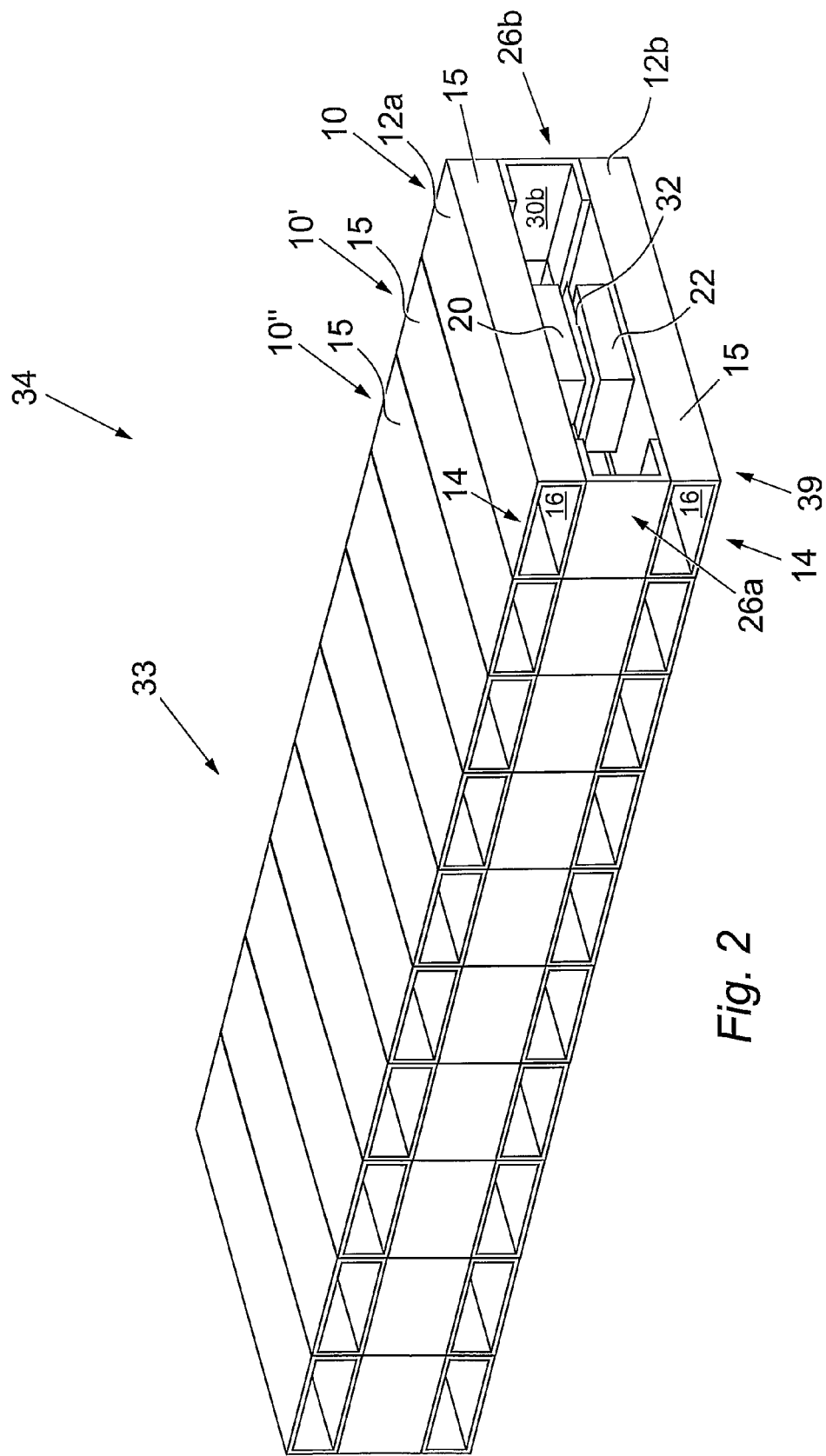
FIG. 2 is a perspective view of an array of the units of FIG. 1 mounted side-by-side, the array forming part of a generator in accordance with an embodiment of the present invention.

Turning firstly to FIG. 1, there is shown a perspective view of a magnetic flux conducing unit in accordance with an embodiment of the present invention, the unit indicated generally by reference numeral 10. A number of the units 10 are provided in a generator of a power generation machine, typically a direct-drive linear wave power generation machine which utilises kinetic wave energy to generate power from a buoy or the like at or near the sear surface. FIG. 2 shows an array 33 of the units 10 mounted side-by-side, and which forms part of a generator 34. The generator 34 typically comprises a number of such arrays 33, which may be stacked and/or provided side-by-side.

The unit 10 generally comprises at least one magnetic flux conducting element 12 having at least two regions of different magnetic flux carrying capacities 14 and 16. In the illustrated embodiment, the unit 10 includes two such elements in the form of an upper element 12a and a lower element 12b, and each element 12a and 12b includes regions 14 and 16 (which constitute material receiving spaces) of different magnetic flux carrying capacities. Each element 12a and 12b is in fact formed as a generally hollow elongate box 15, which is rectangular in cross-section and open at opposite ends, the box 15 defining the region 14 and being formed of a material having a relatively high flux carrying capacity, typically iron or steel.

The box 15 also defines the region 16, which takes the form of a void or chamber extending the length of the box 15 and which, in a typical generator, will be air-filled. Air (which constitutes a substantially magnetically impermeable material) has a much lower magnetic flux carrying capacity than iron/steel, therefore in use of the unit 10, a majority of magnetic flux flow within the elements 12a and 12b is channelled through the respective boxes 15. In an alternative form, the voids may be fluid filled and the fluid (which constitutes a substantially magnetically impermeable material) caused to flow in the voids by means of a pump (not shown) to thereby provide for cooling of the magnetic flux conducting elements 12. In use of such a form, the magnetic flux conducting elements 12 are stationary and the coil assembly (not shown) is moved in relation to the magnetic flux conducting elements.

In providing a magnetic flux conducting unit 10 including two such hollow magnetic flux conducting elements 12a and 12b, a weight of the unit 10 can be significantly reduced when compared to units found in conventional generators of the type described above, whilst still providing good magnetic flux density across an air gap 18 (which constitutes a coil receiving space) of the unit. Indeed, preliminary investigations carried out by the Applicant suggest that a reduction in mass of the order of 65% (compared to a solid section element of a conventional generator unit) can be achieved whilst both maintaining a capacity of the element to resist mechanical deformation to around 90 percent of that of a comparable solid section element, and with a reduction in magnetic flux density in the air gap 18 of only around 5 percent.

The unit 10 and its operation within a generator will now be described in more detail.

Following the teachings of the applicant's International Patent Application No. PCT/GB2007/000883, the elements 12a and 12b are spaced apart and each carry a respective magnet 20, 22 arranged such that magnetic flux flow paths 24a, 24b (indicated in broken outline) extend in clockwise and anti-clockwise directions, respectively, when viewing FIG. 1 in the direction A. It will be understood that in order to achieve this, the poles of the magnets 20 and 22 are orientated S-N/S-N when viewing FIG. 1 from top to bottom.

In addition, the unit 10 includes connecting portions 26a, 26b at opposite ends of the elements 12a and 12b, which are generally C-shaped in cross-section and which connect the elements 12a and 12b. Magnetic flux flows between the elements 12a and 12b through the connecting portions 26a and 26b (as indicated in broken outline in FIG. 1). Magnetic attraction forces between the elements 12a and 12b seek to close the air gap 18 between the magnets 20, 22 and thereby impart mechanical loads on the elements. However, these mechanical loads are transmitted to the connecting portions 26a, 26b which thereby serve for reacting and balancing the magnetic attraction forces. Accordingly, in a direct drive machine incorporating a direct-drive generator 34 constructed using the units 10, the generator is assembled in such a way that the units 10 have both magnetic and structural functions, thereby reducing total mass.

In a similar fashion to the elements 12*a* and 12*b*, the connecting portions 26*a*, 26*b* each define two regions 28*a*, 28*b* and 30*a*, 30*b* of different magnetic flux carrying capacities. This is achieved by forming the connecting portions 26*a*, 26*b* to be generally C-shaped, as described above, the connecting portions thereby including recesses or channels defining the regions 30*a*, 30*b* (which constitute material receiving spaces). The parts of the connecting portions 26*a*, 26*b* defining the regions 28*a*, 28*b* are typically of a material having good magnetic flux carrying capacity such as iron or steel.

The air gap 18 of the unit 10 is defined between opposed faces of the magnets 20, 22 and a coil assembly of the generator 34, part of which is shown in FIGS. 1 and 2 and given the reference numeral 32, is located within the air gap 18. As noted above, the array 33 of units 10 will typically be incorporated into a linear generator of a type found in wave machines, with the poles of the magnets in adjacent units 10 oppositely orientated.

The units 10 are coupled to a translator (not shown) which reciprocates the units 10 back and fourth with respect to the coil assembly 32 (or vice-versa), generating an alternating current (AC) output.

In use of the unit 10, a majority of flux flowing around the unit passes through the regions 14 of the elements 12*a* and 12*b* and the regions 28*a*, 28*b* of the connecting portions 26*a*, 26*b*, which form main regions of the elements. Accordingly, primary flux flow in the unit 10 is from the magnet 20 to the magnet 22; from the magnet 22 into the walls of the box 15 of the element 12*b* (the flux splitting and travelling in the two directions 24*a*, 24*b*); along the walls of the box 15 of element 12*b* and into the connecting portions 26*a*, 26*b*; along the walls of the connecting portions 26*a*, 26*b* forming the regions 28*a*, 28*b*; into and along the walls of the box 15 of the element 12*a*, and back to the magnet 20. Minimal magnetic flux flow occurs through the voids 16 in the elements 12*a*, 12*b* or across the recesses 30 of the connecting portions 26*a*, 26*b*.

In addition, with the units 10 located in the array 33 as shown in FIG. 2, flux also flows between the units 10, and thus along a length of the array 33. Specifically, and taking a unit 10 at an end 39 of the array 33 to be a first unit, a second unit 10' is provided adjacent and located in abutment with the first unit 10. The magnets 20 and 22 in the first unit 10 are oriented S-N, S-N and the magnets 20 and 22 in the second unit 10' are oriented N-S, N-S. In addition to separate flux flow paths existing in the first unit 10 (as described above) and in the second unit 10' (in opposite directions to that of the first unit), a flux flow path exists between the box 15 of the element 12*b* of the first unit 10 and the box 15 of the element 12*b* of the second unit 10'. In a similar fashion, flux flows from the second unit 10' to a further adjacent unit 10" between the box 15 of the element 12*a* of the second unit 10' and the box 15 of the element 12*a* of the further unit 10".

These flux flow paths are mirrored along the length of the array 33, depending upon the orientation of the respective magnets 20, 22 of the adjacent units 10.

The flux flow within the individual units 10, and between adjacent units, ensures that a sufficiently high magnetic flux density is achieved within the air gaps 18 whilst reducing the masses of the elements 12*a*, 12*b* and of the connecting portions 26*a*, 26*b*. This in turn leads to the overall mass of the units 10, and thus of the generator incorporating a number of arrays 33 of the units 10, being significantly less than a similar power output machine incorporating a conventional generator.

Figure 3:
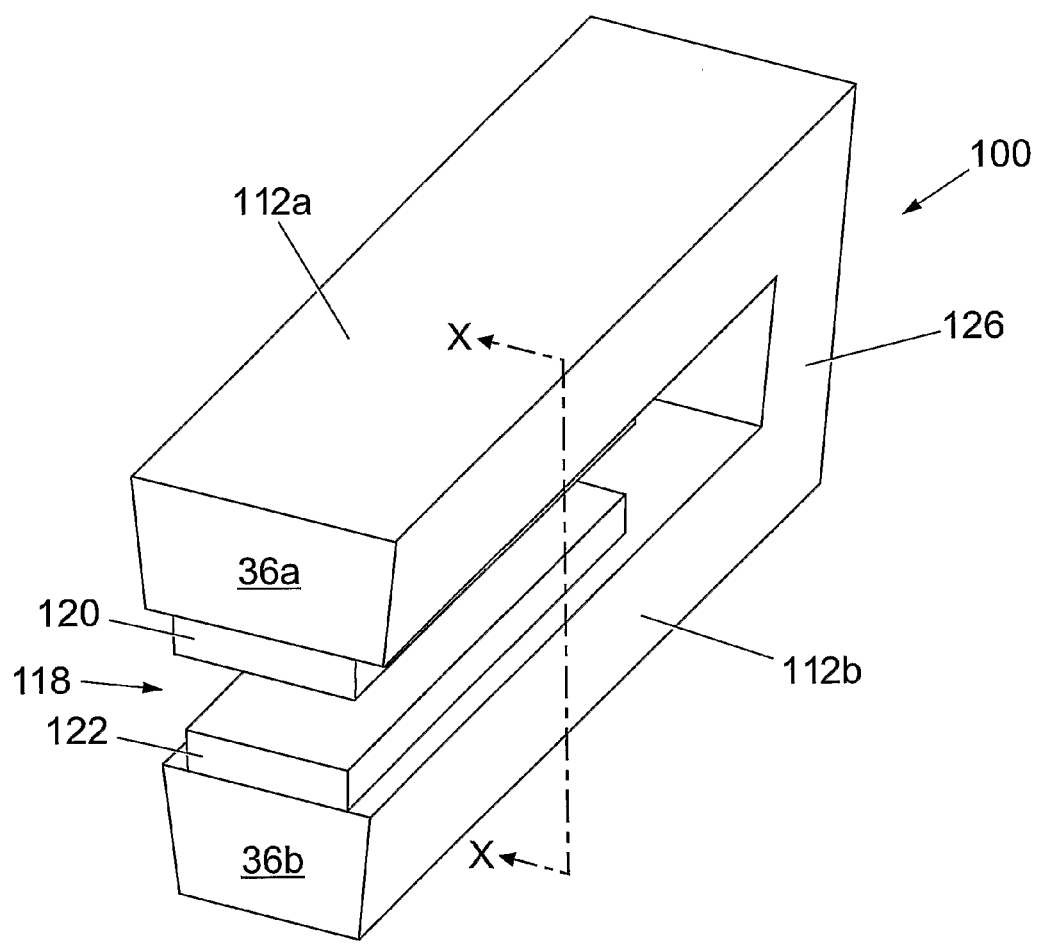
FIG. 3 is a perspective view of a magnetic flux conducting unit in accordance with an alternative embodiment of the present invention.
Figure 4:
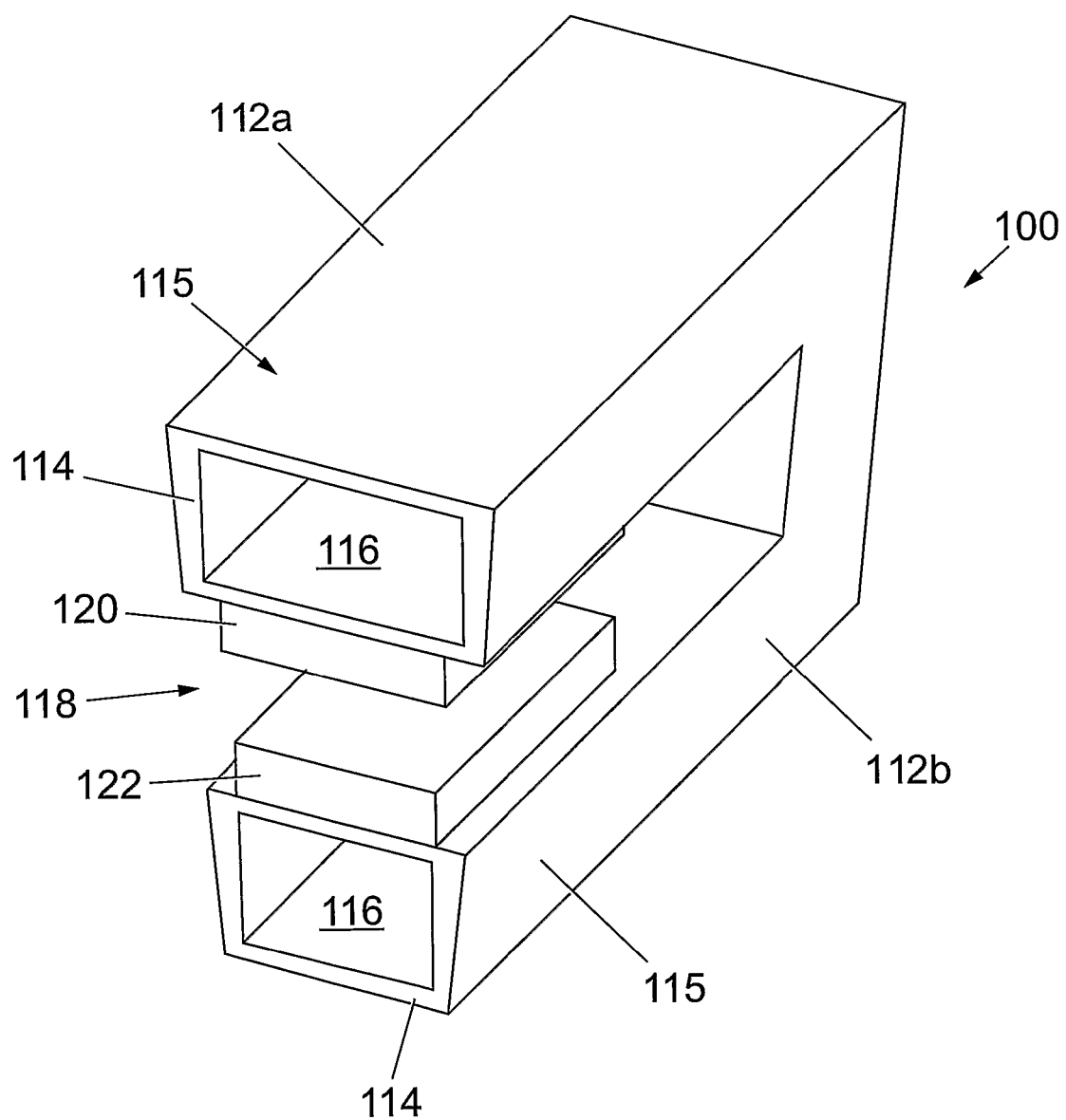
FIG. 4 is a view of the unit of FIG. 3, sectioned about the line X-X of FIG. 3.

Turning now to FIG. 3, there is shown a perspective view of a magnetic flux conducting unit 100 in accordance with an alternative embodiment of the present invention. Like components of the unit 100 with the unit 10 of FIG. 1 share the same reference numerals, incremented by 100. The unit 100 is also shown in FIG. 4, where the unit has been sectioned about the line X-X of FIG. 3. In addition, a generator 134 incorporating a number of the units 100 is shown in the perspective view of FIG. 5, and like components of the generator 134 with the generator 34 of FIG. 2 also share the same reference numerals, incremented by 100. The generator 134 is also shown in FIG. 6, which is an enlarged view sectioned about the line Y-Y in FIG. 5.

The unit 100 includes magnetic flux conducting elements 112*a*, 112*b* and a connecting portion 126 at one end of the elements. The elements are constructed by welding suitably shaped iron or steel plates together, to form a generally C-shaped core comprising the elements 112*a*, 112*b* and the connecting portion 126. Magnets 120, 122 are mounted on the respective elements 112*a*, 112*b* with an air gap 118 (which constitutes a coil receiving space) defined between the magnets for receiving a coil assembly (not shown). In use and in a similar fashion to the unit 10, the connecting portion 126 balances and reacts attraction forces existing between the elements 112*a*, 112*b*.

Figure 5:
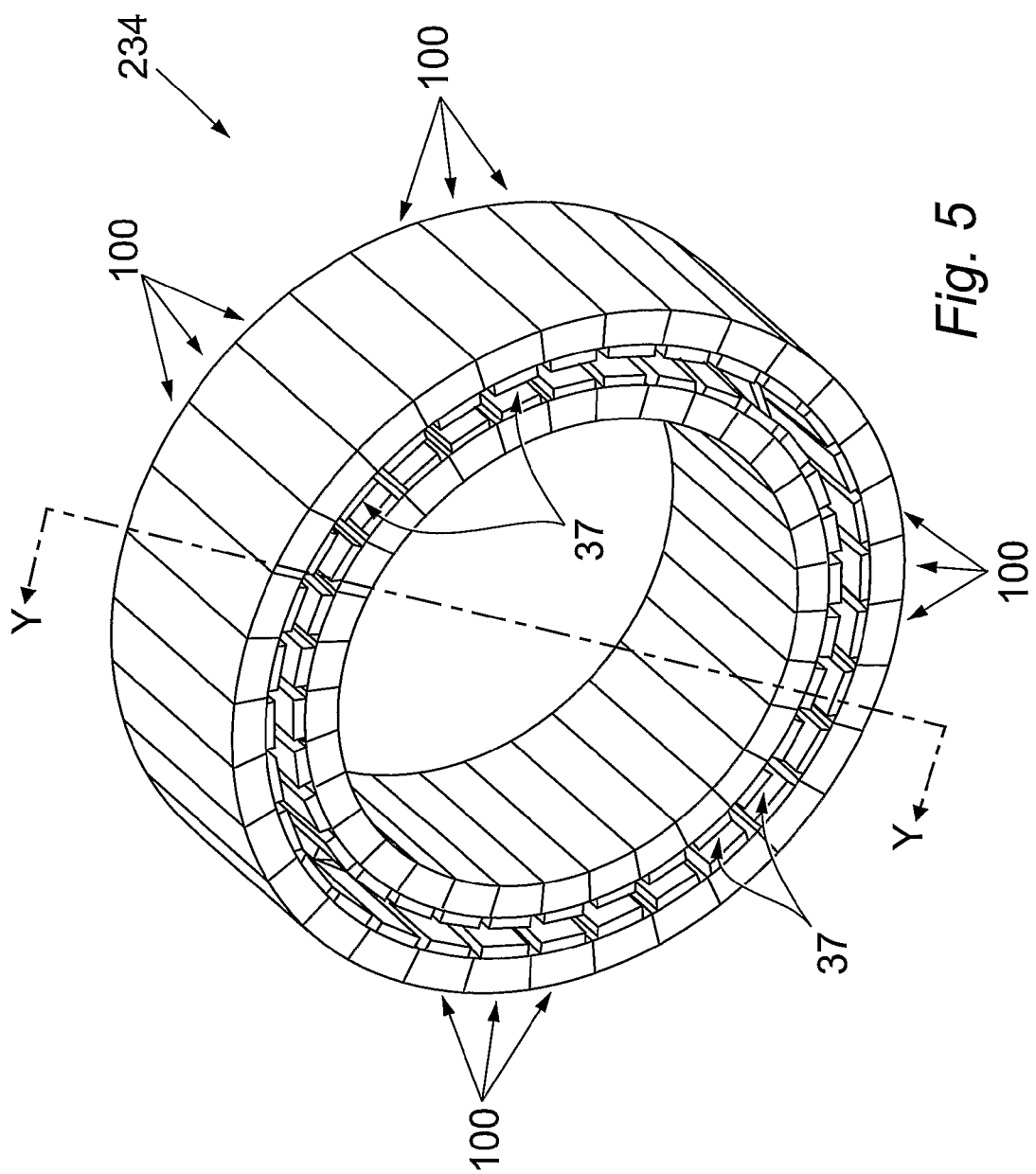
FIG. 5 is a perspective view of part of a generator, incorporating a number of the units of FIG. 3, in accordance with an alternative embodiment of the present invention.
Figure 6:
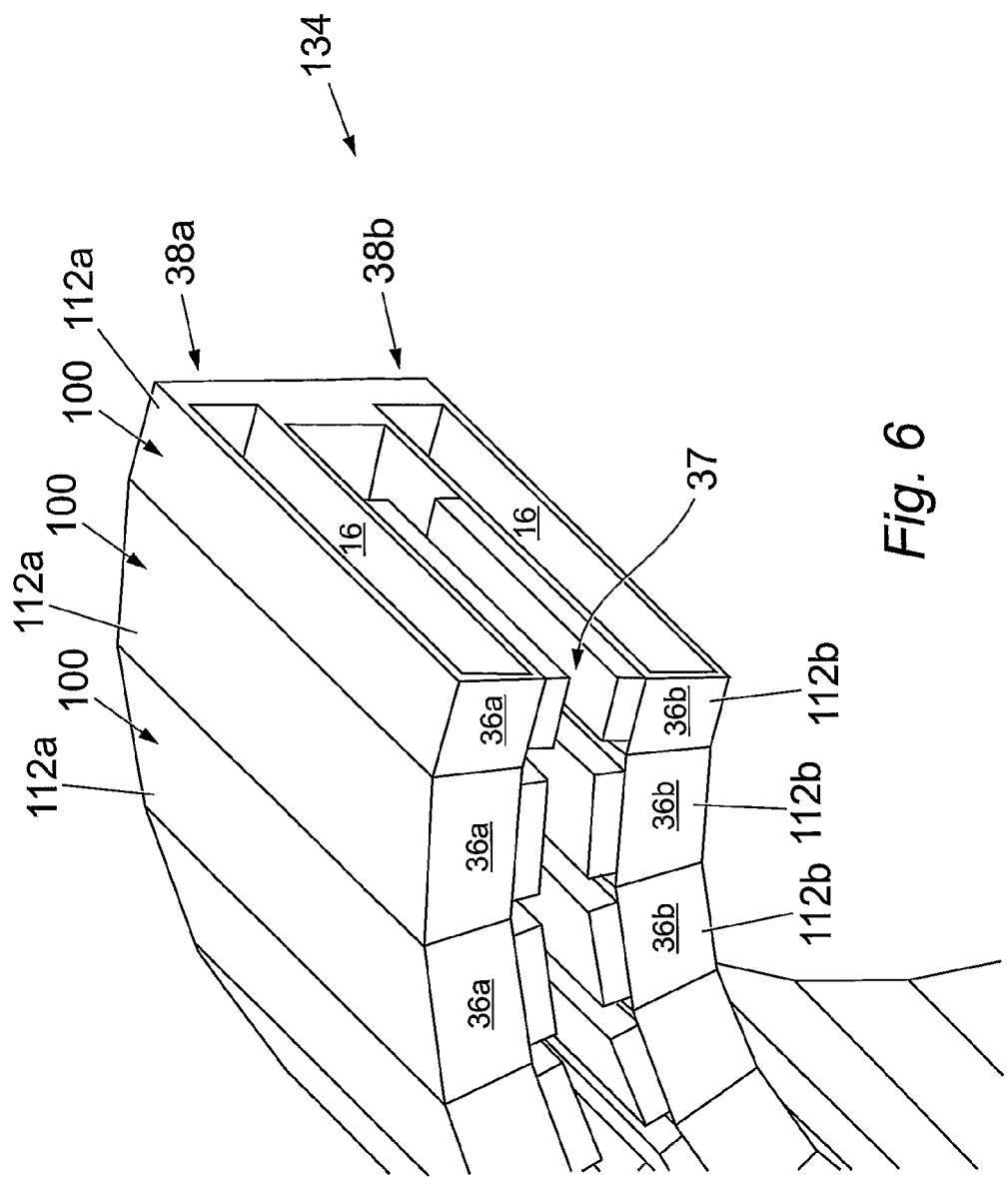
FIG. 6 is an enlarged view of the part of the generator shown in FIG. 5, sectioned about the line Y-Y of FIG. 5.

Only part of the generator 134 is shown in FIG. 5, a coil assembly and associated support equipment being removed, for ease of illustration. As shown in FIG. 5, the units 100 are located in side-by-side abutment, and form a circumferential ring for incorporation in a rotary power generating machine such as wind turbine (not shown). To facilitate location of the units 100 in abutment, the units taper in a radially inward direction, as best shown in FIG. 3. Accordingly, the elements 112*a*, which are provided radially outermost, are of a greater width than the elements 112*b*.

Air gaps 118 are defined between magnets 120 and 122 of the elements 112*a* and 112*b* of each unit 100, the magnets extending along a greater extent of the elements 112*a* and 112*b* than the magnets 20 and 22 of the unit 10. Also, the elements 112*a* and 112*b* are each closed at respective ends 35 by plates 36*a* and 36*b*, to define closed voids or chambers 116. Accordingly, the elements 112*a*, 112*b* are also closed at their opposite ends, this facilitating mounting of the units 100 on a rotor support plate (not shown). A ring carrying appropriate windings (not shown) is located in the annular channel 37 which extends around the circumference of the generator 34 through the various air gaps 118.

As noted above, the units 100 are mounted on a rotor shaft via a suitable rotor support plate, for rotation with a prime mover of the wind generation machine. With the coil assembly located in the channel 37, rotation of the prime mover, and thus of the units 100, serves to generate an alternating current in a similar fashion to that described above.

Figure 7:
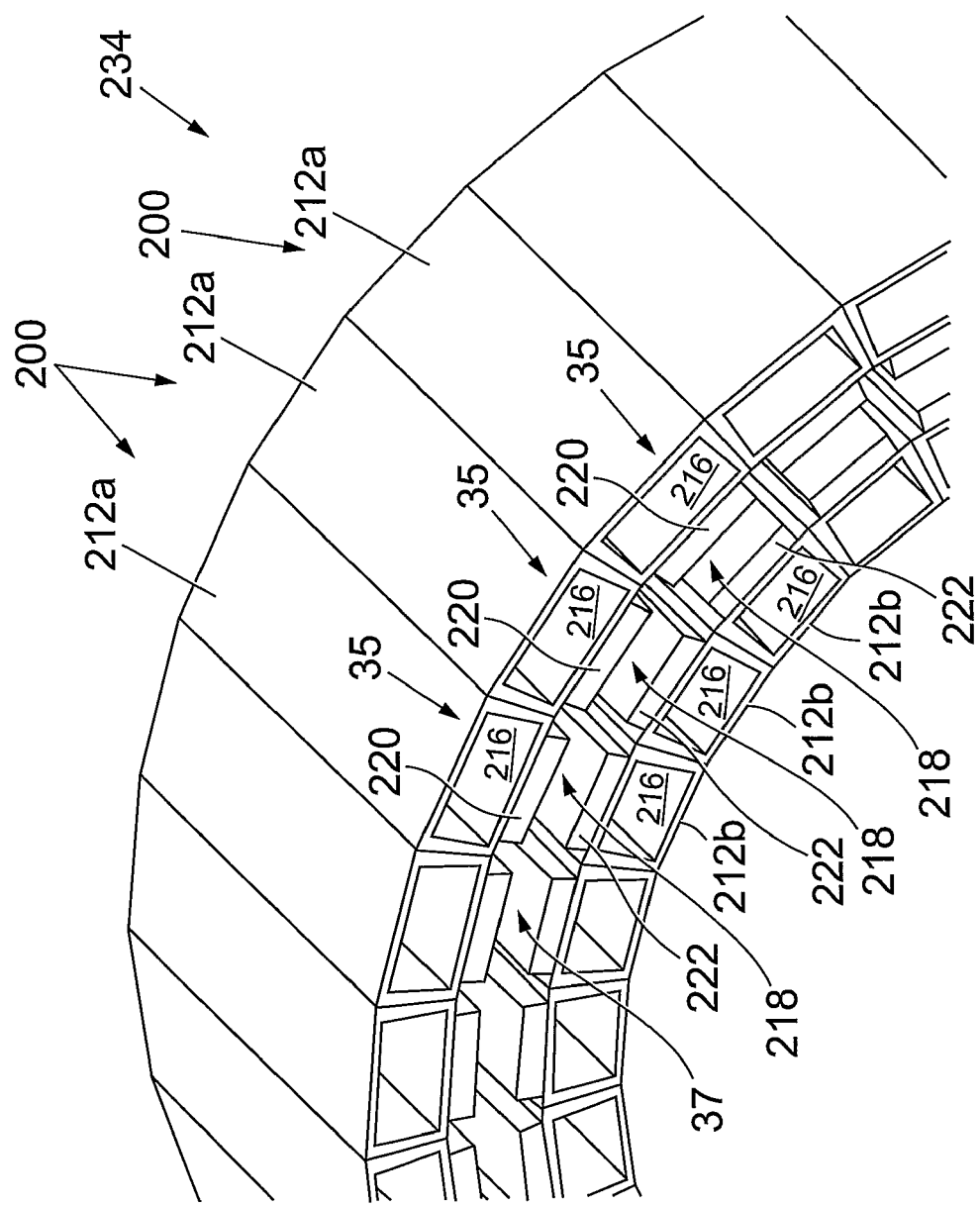
FIG. 7 is a perspective view of part of a generator in accordance with a further alternative embodiment of the present invention.

Turning now to FIG. 7, there is shown a generator in accordance with a further alternative embodiment of the present invention, the generator indicated generally by reference numeral 234. The generator 234 includes a number of magnetic flux conducting units 200 of similar construction to the units 100 of FIGS. 3 to 6. Like components of the units 200 with the units 100, and of the generator 234 with the generator 134, share the same reference numerals, incremented by 100.

The unit 200 is in fact of very similar construction to the unit 100, save that ends 35 of magnetic flux conducting elements 212*a* and 212*b* of the unit 200 are open. In this fashion, voids or chambers 116 of the elements 212*a*, 212*b* are open and not closed off by end plates. Constructing the elements 212*a*, 212*b* such that the voids 216 are open in this fashion further reduces the mass of the unit 200, and thus of the generator 234, with a consequent reduction in mechanical strength and magnetic flux density in air gaps 218 defined between magnets 120, 122 of the units 200.

Figure 8:
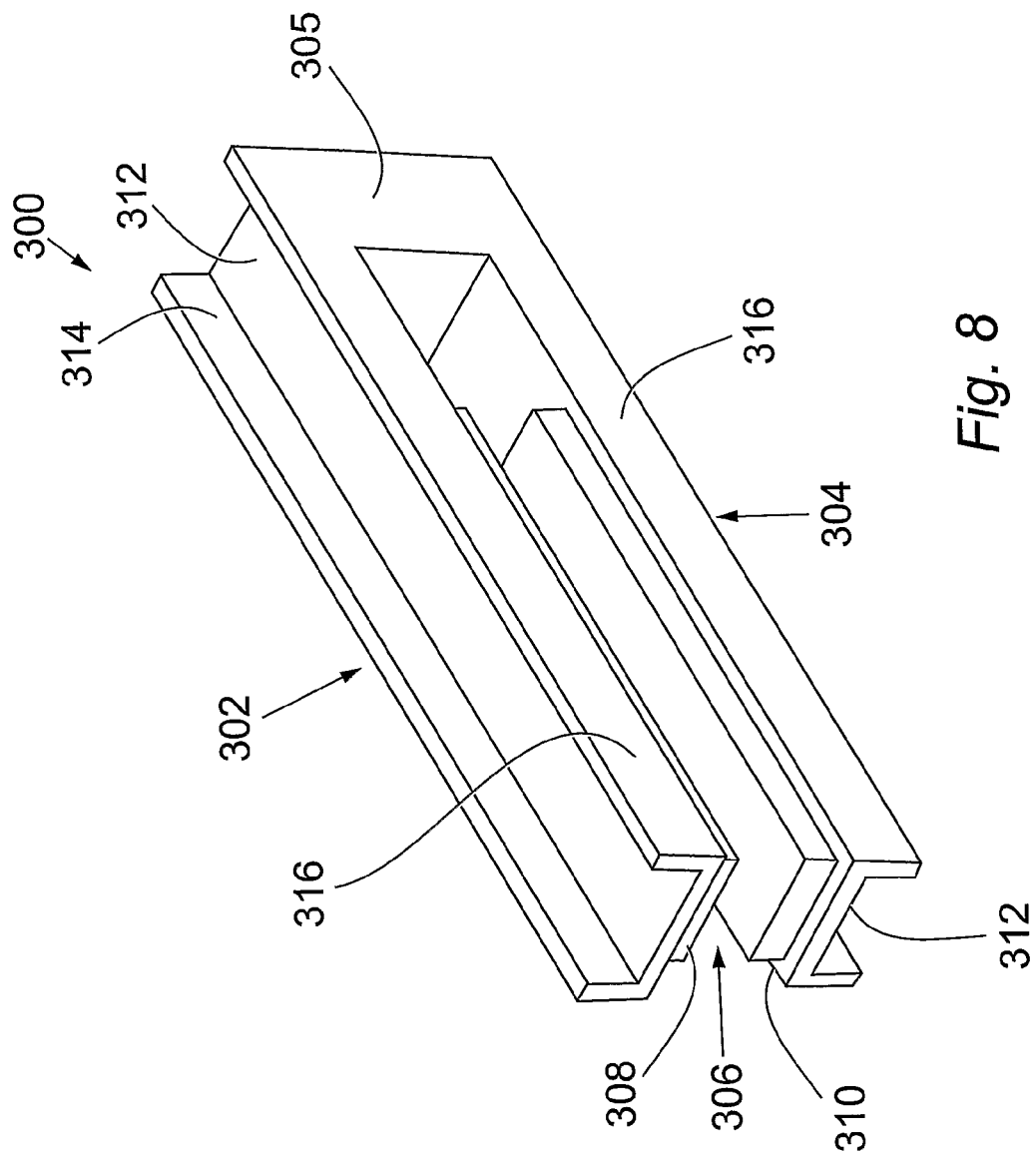
FIG. 8 is a perspective view of a further embodiment of magnetic flux conducting element.

A perspective view of a further embodiment of magnetic flux conducting element 300 is shown in FIG. 8. The flux conducting element is C-shaped such that it defines a pair of spaced apart opposing arms 302, 304, which define a coil receiving space 306 between them. The first and second arms 302, 304 are connected to each other by a connecting portion 305. In the present embodiment, the connecting portion 305 is integrally formed with the first and second arms 302, 304. First and second magnets 308, 310 are attached to respective opposing faces of the first and second arms so as to provide a space between the magnets to receive the coil (not shown). Each arm of the flux conducting element has a main body 312 from which a first elongate member 314 extends along the entire length of a first edge of the arm. Each arm of the flux conducting element also has a second elongate member 316 extending along the entire length of a second edge of the arm, the second edge opposing the first edge. A channel is thus defined between each pair of first and second elongate members 314, 316, with the opening to the channel facing in a substantially opposite direction to the coil receiving space. The channel constitutes a material receiving space that accommodates a substantially magnetically impermeable material. In this embodiment the substantially magnetically impermeable material is air. Compared with a flux conducting element of rectangular cross-section, i.e. a flux conducting element without channels, the embodiment of FIG. 8 is 65% lighter where the same magnetic airgap flux density is achieved and where the arms 302, 304 deflect by the same amount.

It will be understood that the principals of the present invention, in providing magnetic flux conducting units having conducting elements incorporating voids or recesses, may be applied to a wide range of different types of generators or indeed motors in order to achieve a reduction in mass. As will be understood by the notionally skilled reader, a motor has the same essential structural form as a generator with a motor differing functionally in that electric power is applied to the motor to provide movement of the coil and magnetic flux conducting unit in relation to each other. Thus, no further description of the application of the present invention to motors is considered necessary.

Furthermore, whilst the above described embodiments of the invention illustrate magnetic flux conducting elements having single voids or recesses, it will be understood that the magnetic flux conducting elements may comprise a plurality of voids, and that the connecting portion may similarly comprise a plurality of recesses. Additionally, it will be understood that the magnetic flux conducting elements may be shaped to include recesses, in a similar fashion to the connecting portions, and vice versa.

Other shapes of magnetic flux conducting units than those described above may be employed, for use both in generators or motors of both rotary and linear form and function. Such units may utilise the principle of balancing and reacting mechanical loads in the units, generated by magnetic attraction forces, through connecting portions between opposed magnetic flux conducting elements.

The present invention may be applied in iron-cored or air-cored generators or motors. More specifically, iron-cored apparatus comprises a stator that is formed from magnetic material. For example, in the embodiments described above, the coil assembly constitutes the stator and the coils of the coil assembly are wound on magnetic material. Air-cored apparatus, on the other hand, comprises a stator that is formed from non-magnetic material. Thus, in the embodiments described above the coils of the coil assembly are wound on non-magnetic material.

The at least one void or recess may contain a liquid or a gel, the gel optionally containing solids particles suspended therein. Alternatively, the at least one void or recess may be at least partially filled with a solids material of a lower density than a remainder of the element defining the void/recess, and the solids material may be a time-setting and/or molten material supplied into the chamber/void. In still further alternatives, the element may comprise a core of a solids material with a shell or frame around the core, and the core may be of a lower density than the shell.

The invention claimed is:

1. A magnetic flux conducting unit comprising:
   a pair of spaced apart magnetic flux conducting elements formed of a magnetically permeable material and defining
   at least one material receiving space;
   a magnetically permeable connecting portion connecting the pair of spaced apart magnetic flux conducting elements;
   wherein the pair of spaced apart magnetic flux conducting elements and the magnetically permeable connecting portion define a generally C-shaped element;
   respective magnets arranged relative to the spaced apart magnetic flux conducting elements such that magnetic attraction forces between the spaced apart magnetic flux conducting elements are reacted through and balanced within the magnetically permeable connecting portion;
   wherein a coil receiving space is defined between opposed faces of the respective magnets, receives a coil assembly of an electromagnetic apparatus, and is spaced apart from each of the material receiving spaces by a part of a spaced-apart magnetic flux conducting element of the pair of spaced-apart magnetic flux conducting elements; and
   wherein each of the at least one material receiving space accommodates a substantially magnetically impermeable material and is defined by at least two walls of a magnetic flux conducting element of the pair of spaced apart magnetic flux conducting elements, the at least two walls being disposed on a same side of the coil receiving space.

2. A magnetic flux conducting unit according to claim 1, wherein the at least one material receiving space is formed as an open channel, an opening of the channel being one of:
   facing towards the coil receiving space; and
   facing away from the coil receiving space.

3. A magnetic flux conducting unit according to claim 2, wherein the opening of the channel faces in a substantially opposite direction to the coil receiving space.

4. A magnetic flux conducting unit according to claim 1, wherein the at least one material receiving space is formed as a bore extending along at least a part of the magnetic flux conducting element.

5. A magnetic flux conducting unit according to claim 1, wherein the material receiving space is of substantially rectangular form along a direction substantially perpendicular to a direction of flow of flux through the magnetic flux conducting element.

6. A magnetic flux conducting unit according to claim 1, wherein the at least one material receiving space extends along a length of the magnetic flux conducting element.

7. A magnetic flux conducting unit according to claim 1, wherein the at least one material receiving space extends along a direction of flow of magnetic flux in the at least one magnetic flux conducting element during use of the magnetic flux conducting unit.

8. A magnetic flux conducting unit according to claim 1, wherein the magnetic flux conducting element comprises a main body and at least one elongate member extending from and along the main body, the at least one material receiving space being defined by the at least one elongate member and the main body.

9. A magnetic flux conducting unit according to claim 1, wherein the magnetic flux conducting element is one of generally I-shaped or generally u-shaped in cross-section.

10. A magnetic flux conducting unit according to claim 1, wherein the substantially magnetically impermeable material comprises at least one of a fluid, a gel and a solid.

11. A magnetic flux conducting unit according to claim 1, wherein the material receiving space is substantially completely filled with the magnetically impermeable material.

12. A magnetic flux conducting unit according to claim 1, wherein the magnetic flux conducting unit is stationary when in use, the magnetic flux conducting unit further comprising a pump and the at least one magnetic flux conducting element being configured for flow of a substantially magnetically impermeable fluid through the at least one material receiving space, the pump being operative to effect a flow of the fluid through the material receiving space.

13. A magnetic flux conducting unit according to claim 1, wherein the magnetically permeable connecting portion connects opposing faces of the magnetic flux conducting elements.

14. A magnetic flux conducting unit according to claim 13, wherein the at least one connecting portion defines at least one material receiving space.

15. Electromagnetic apparatus comprising the magnetic flux conducting unit according to claim 1, in which the electromagnetic apparatus is one of a generator and a motor.

16. Electromagnetic apparatus according to claim 15, in which the electromagnetic apparatus comprises at least one coil assembly received in the coil receiving space.

17. Electromagnetic apparatus according to claim 16, in which each of the at least one coil assembly is one of an air-cored coil assembly and an iron-cored coil assembly.

18. A power generation machine comprising an electromagnetic apparatus configured to operate as generator, the electromagnetic apparatus comprising a magnetic flux conducting unit, the magnetic flux conducting unit comprising:

a pair of spaced apart magnetic flux conducting elements formed of a magnetically permeable material and defining at least one material receiving space;

a magnetically permeable connecting portion connecting the pair of spaced apart magnetic flux conducting elements;

wherein the pair of spaced apart magnetic flux conducting elements and the magnetically permeable connecting portion define a generally C-shaped element;

respective magnets arranged relative to the spaced apart magnetic flux conducting elements such that magnetic attraction forces between the spaced apart magnetic flux conducting elements are reacted through and balanced within the magnetically permeable connecting portion;

wherein a coil receiving space is defined between opposed faces of the respective magnets, receives a coil assembly of an electromagnetic apparatus, and is spaced apart from each of the material receiving spaces by a part of a spaced-apart magnetic flux conducting element of the pair of spaced-apart magnetic flux conducting elements; and wherein each of the at least one material receiving space accommodates a substantially magnetically impermeable material and is defined by at least two walls of a magnetic flux conducting element of the pair of spaced apart magnetic flux conducting elements, the at least two walls being disposed on a same side of the coil receiving space.

\* \* \* \* \*